United States Patent [19]
MacDonald

[11] Patent Number: 5,913,224
[45] Date of Patent: Jun. 15, 1999

[54] PROGRAMMABLE CACHE INCLUDING A NON-LOCKABLE DATA WAY AND A LOCKABLE DATA WAY CONFIGURED TO LOCK REAL-TIME DATA

[75] Inventor: James R. MacDonald, Buda, Tex.

[73] Assignee: Advanced Micro Devices, Inc., Sunnyvale, Calif.

[21] Appl. No.: 08/805,554

[22] Filed: Feb. 26, 1997

[51] Int. Cl.[6] .................................................. G06F 12/14
[52] U.S. Cl. ..................... 711/125; 711/167; 711/145; 711/144
[58] Field of Search ................... 711/144, 145, 711/167, 125

[56] References Cited

U.S. PATENT DOCUMENTS 5,353,425  10/1994  Malamy et al. ................... 711/144
5,487,162  1/1996   Tanaka et al. .
5,638,537  6/1997   Yamada et al. ................... 711/167

*Primary Examiner*—Tod R. Swann
*Assistant Examiner*—David Langjahr
*Attorney, Agent, or Firm*—Conley, Rose & Tayon, PC; B. Noel Kivlin

[57] ABSTRACT

A computer system is disclosed which provides for execution of real-time code from cache memory. A cache management unit provides the real-time code to the cache memory from system memory upon a initiation of a read operation by a processor. Once in cache memory, the processor executes the real-time code from cache memory instead of system memory. The cache management unit detects read hits to cache each time the processor requests an instruction of code that is stored in the cache memory. Lock bits associated with each line of cache lock the contents of the line preventing the line from being overwritten under normal cache operation in which the least most recently used cached data is replaced by presently accessed data. Alternatively, one of a plurality of cache data ways may be dedicated to storing real-time code. Real-time code stored in the dedicated data way is not replaceable and thus is locked.

17 Claims, 5 Drawing Sheets

PROGRAMMABLE CACHE INCLUDING A NON-LOCKABLE DATA WAY AND A LOCKABLE DATA WAY CONFIGURED TO LOCK REAL-TIME DATA

BACKGROUND OF THE INVENTION

1. Field of the Invention

This invention relates to more efficient execution of software in computer systems. More particularly, the present invention relates to computer systems for executing software stored in cache memory subsystems. Still more particularly, the present invention relates to cache subsystems that load real-time event processing software for more efficient execution.

2. Description of the Relevant Art

Software to be executed by a microprocessor typically is stored on a floppy or fixed disk medium. Once a request is made by a user to execute a program, the program is loaded into the computer's system memory which usually comprises dynamic random access memory devices (DRAM). The processor then executes the code by fetching an instruction from system memory, receiving the instruction over a system bus, performing the function dictated by the instruction, fetching the next instruction, and so on.

Generally, whenever system memory is accessed, there is a potential for delay between the time the request to memory is made (either to read or write data) and the time when the memory access is completed. This delay is referred to as "latency" and can limit the performance of the computer.

There are many sources of latency. For example, operational constraints with respect to DRAM devices cause latency. Specifically, the speed of memory circuits is based upon two timing parameters. The first parameter is memory access time, which is the minimum time required by the memory circuit to set up a memory address and produce or capture data on or from the data bus. The second parameter is memory cycle time, which is the minimum time required between two consecutive accesses to a memory circuit. For DRAM circuits, the cycle time typically is approximately twice the access time. DRAM circuits today generally have access times in the approximate range of 60–100 nanoseconds, with cycle times of 120–200 nanoseconds. The extra time required for consecutive memory accesses in a DRAM circuit is necessary because the internal memory circuits require additional time to recharge (or "precharge") to accurately produce data signals. Thus, even a processor running as slow as 10 MHz cannot execute two memory accesses in immediate succession (i.e., with adjacent clock pulses) to the same 100 nanosecond DRAM chip, despite the fact that a clock pulse in such a microprocessor is generated every 100 nanoseconds. A DRAM chip requires time to stabilize before the next address in that chip can be accessed. Consequently, in such a situation the processor must wait by executing one or more loop cycles before it can again access data in the DRAM circuit. Typically, a memory controller unit ("MCU") is provided as part of the computer system to regulate accesses to the DRAM main memory. Latency caused by long memory cycle times relative to processor speeds has become a particularly acute problem today as processor speeds in excess of 100 MHz are commonplace. Instead of waiting one or two clock cycles to again access a 100 nanosecond DRAM device, today's "486" and "Pentium" processors must wait 20 or more clock cycles.

In addition to the delays caused by access and cycle times, DRAM circuits also require periodic refresh cycles to protect the integrity of the stored data. These cycles consume approximately 5 to 10% of the time available for memory accesses, and typically are required approximately every 4 milliseconds. If the DRAM circuit is not refreshed periodically, the data stored in the DRAM circuit will be lost. Thus, memory accesses may be halted while a refresh cycle is performed.

Further, most, if not all, computer architectures today include multiple bus master systems. Any one of a number of bus masters may obtain ownership or control of the system bus and thereby access system memory. Normally, granting a bus master device ownership of the system bus, from among competing requests for ownership, is based on a predetermined hierarchy. In a hierarchy scheme, one bus master device may have a higher position in the hierarchy than another bus master device. Accordingly, the former device would be granted ownership of the system bus if there was a conflict between the two devices where each device contemporaneously sought control of the bus. Although hierarchy schemes are valuable for resolving conflicts between multiple bus master devices requesting control of the bus to access system memory, such schemes force a bus master that must yield to a higher priority bus master to wait while the other device executes its memory transaction, thereby causing latency with respect to the waiting device.

The latency associated with memory accesses may be different and unpredictable from one memory access to the next. For many software applications unpredictable latency is not a significant problem. However, for core sequences, especially those related to real-time event processing such as music synthesis which implement digital signal processing, unpredictable latency can greatly interfere with proper performance and produce undesirable results.

To expedite memory transfers, most computer systems today incorporate cache memory subsystems. Cache memory is a high-speed memory unit interposed between a slower system DRAM memory and a processor. Cache memory devices usually have speeds comparable to the speed of the processor and are much faster than system DRAM memory. The cache concept anticipates the likely reuse by the microprocessor of selected data in system memory by storing a copy of the selected data in the cache memory. When a read request is initiated by the processor for data, a cache controller determines whether the requested information resides in the cache memory. If the information is not in the cache, then the system memory is accessed for the data and a copy of the data may be written to the cache for possible subsequent use. If, however, the information resides in the cache, it is retrieved from the cache and given to the processor. Retrieving data from cache advantageously is faster than retrieving data from system memory, involving both less latency and more predictable latency.

Code, as well as data, is subject to being stored in cache. Cache memory size, however, is generally much smaller than system memory and is used only to store the most recently used data or code anticipating the reuse of that information. Because the cache is relatively small and is used only for storing the most recently accessed code or data, old code or data (i.e., less recently used code or data in cache) is at risk of being overwritten by new code or data. Although replacement generally causes no problem for many types of data and code, replacement of real-time code can detrimentally affect the predictability of the latency of accesses to the real-time code or data and thus may cause improper or poor multimedia performance.

BRIEF SUMMARY OF THE INVENTION

The problems outlined above are in large part solved by the teachings of the present invention. The present invention relates to a system and method for locking real-time code into a cache memory to avoid repetitively accessing the real-time code from system memory. A processor reads the real-time code and the cache subsystem writes the code into an entry of the cache upon detecting a read miss. An output signal from the processor during the reading of the real-time code indicates to the cache subsystem the real-time nature of the code. In response, the cache subsystem locks the code into the cache preventing overwriting the code with more recently used data. The real-time code is locked into cache by setting a lock bit associated with each line of cache containing the real-time code. Once stored and locked into the cache subsystem, the processor fetches instructions for execution. Because the instructions have been stored in cache, the cache subsystem, according to normal cache protocol, supplies the requested instructions.

After the processor has completed execution of the real-time code from the cache subsystem, the processor may direct the cache subsystem to unlock the previously executed real-time code to allow for other real-time code modules to be executed from cache memory. Unlocking real-time code is accomplished by clearing the lock bits associated with the lines containing real-time code.

An alternative to setting lock bits associated with each line of cache containing real-time code includes a real-time address register that generally defines which system memory addresses contain real-time code. The register preferably includes a starting address of the real-time code and a size value representing the number of addresses containing the real-time code. The register also includes a valid bit to indicate whether the real-time locking feature of the invention is turned on or off. When the valid bit is off, all information, including real-time code, is stored in cache according normal cache behavior. However, when the valid bit is on, nonreal-time code is stored in a first way in the cache and real-time code is stored in second cache way. Real-time code stored in the second cache way is not replaced and thus is locked into the cache. To unlock real-time code in the alternative embodiment, the valid bits in the real-time register is cleared.

BRIEF DESCRIPTION OF THE DRAWINGS

Other objects and advantages of the invention will become apparent upon reading the following detailed description and upon reference to the accompanying drawings in which.

Figure 1:
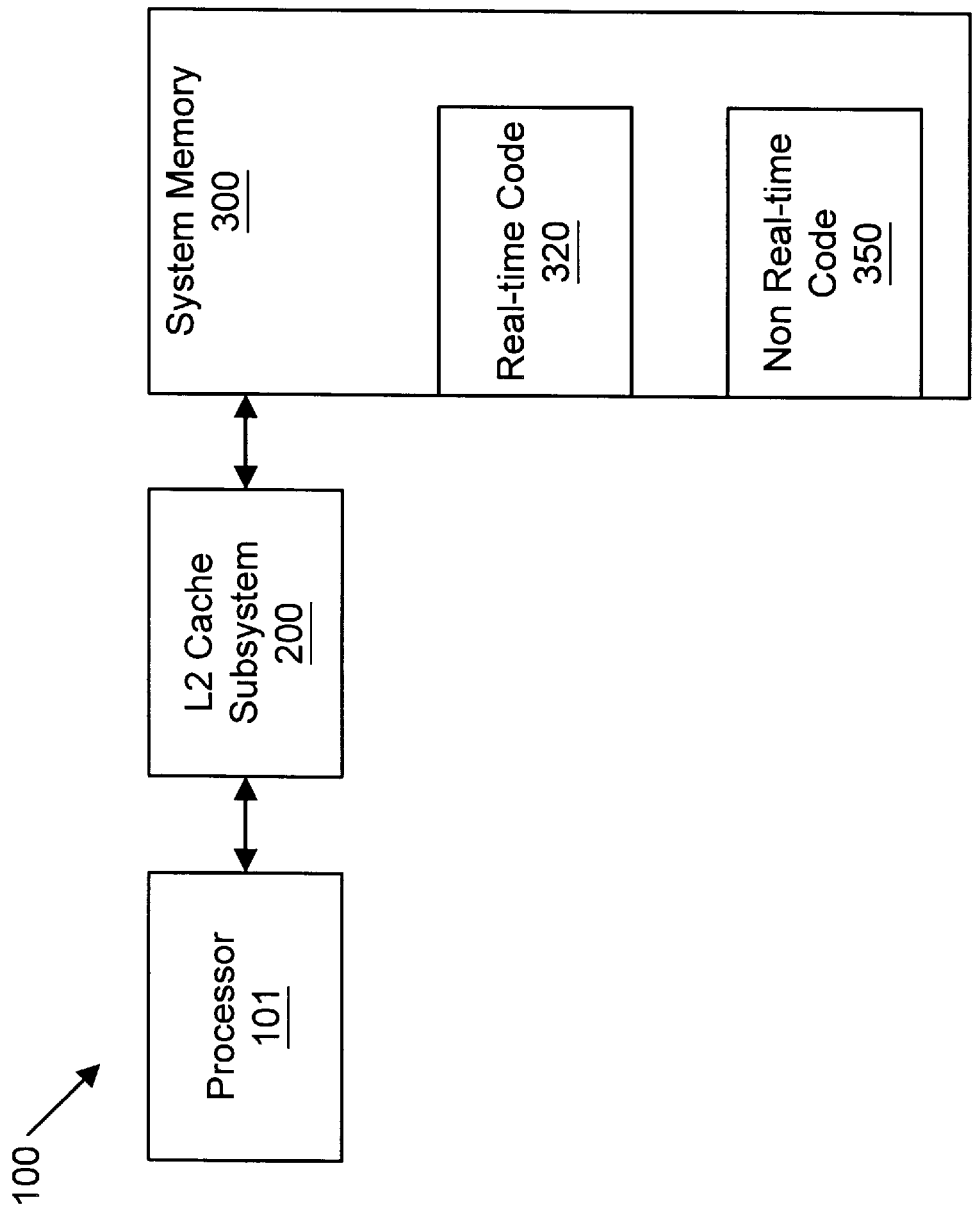
FIG. 1 is a block diagram representation of a typical computer system.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to the drawings, FIG. 1 is a block diagram of a computer system 100 to which the present invention is adapted. A processor 101 couples to a system memory unit 300 via an L2 cache subsystem 200. Information stored in system memory 300 is accessible by the processor 101 and accessed data preferably is made available to L2 cache subsystem 200 for temporary storage consistent with commonly known cache techniques. As one of ordinary skill in the art will recognize, many different types of information is stored in system memory 300 including real-time code 320 and non-real-time code 350. Processor 101 may fetch code from an internal cache, L2 cache subsystem 200 or system memory 300. As described in greater detail below, however, processor 101 preferably executes real-time code 320 from the L2 cache subsystem, rather than system memory 300, thereby reducing deleterious latency effects on real-time computations.

Figure 2:
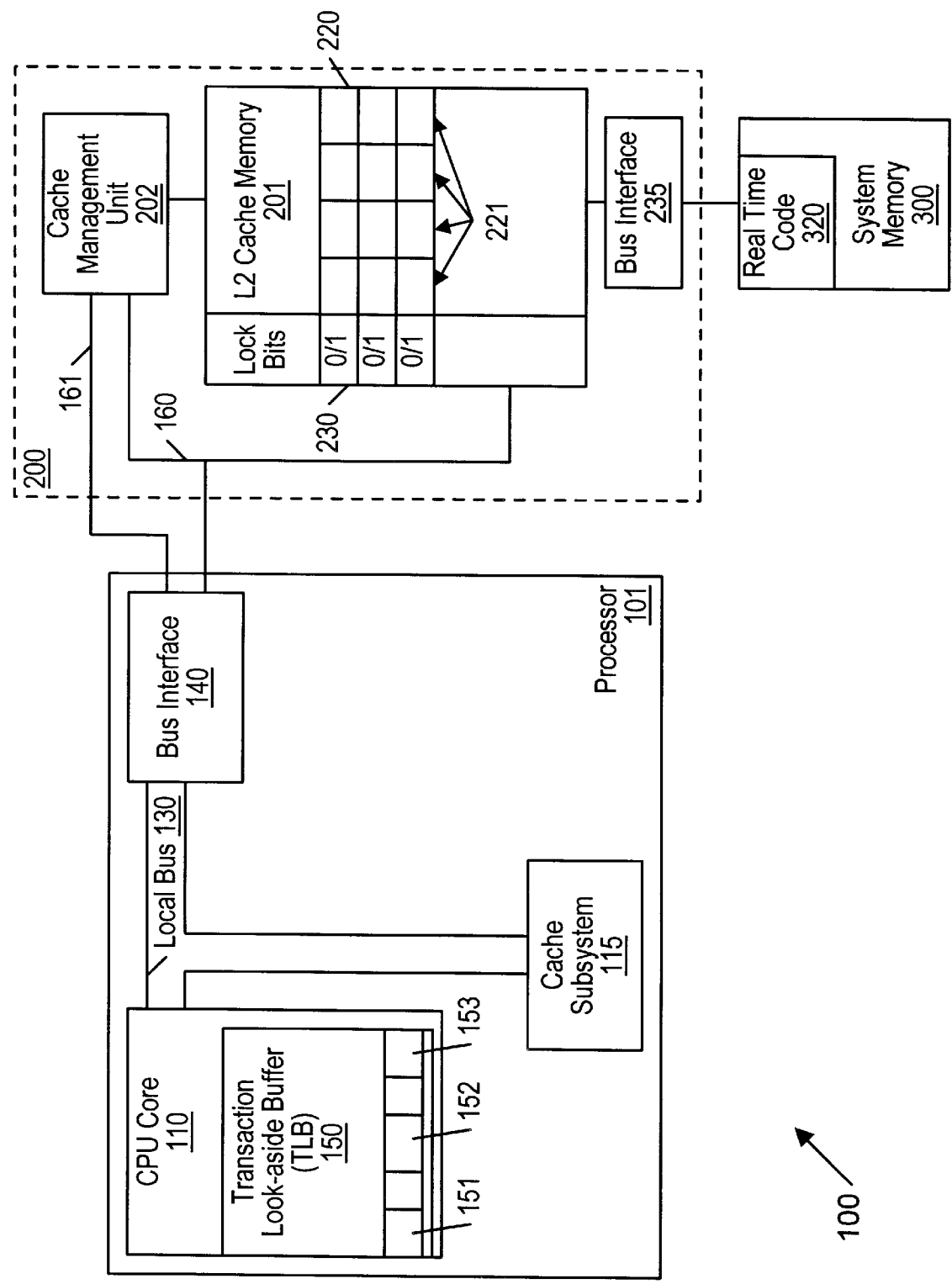
FIG. 2 is a block diagram of the computer system consistent with the preferred embodiment for locking real-time code into cache.

Referring now to FIG. 2, the processor 101, L2 cache subsystem 200, and system memory 300 is shown in greater detail. Consistent with the preferred embodiment, the processor 101 includes a CPU core 110 coupled to an internal cache memory subsystem 115 and a local bus interface 140 via local bus 130. Local bus 130 has a predetermined bit width and is the processor's primary bus. Bus interface 140 provides processor 101 with an interface to L2 cache subsystem 200 over lines 160, 161. The CPU core 110 also includes a translation lookaside table ("TLB") 150.

As illustrated, computer system 100 embodies a single processor. It is understood, however, that the present invention may be adapted to multi-processor systems. CPU core 110 is a data processing unit that implements a predetermined instruction set. Exemplary processing units include models 80386, 80486, and Pentium microprocessors. The present invention should not be limited to any particular processing units.

The TLB 150 generally comprises a cacheable set of table entries 151 to provide translations between virtual addresses and physical addresses, as one of ordinary skill in the art would know. Normally, a page address is derived from the upper order bits of the virtual address and used to access physical page addresses in the TLB. Pages range in size, but 4K bytes is typical. Also, stored in each table entry are various attributes such as read/write bits 152 for indicating whether the data stored at the associated physical address is read-only, write-only, or both. Consistent with the preferred embodiment, the TLB 150 includes with each entry 151 a real-time code bit 153 that specifies whether the information stored at the associated physical page address includes real-time code or not. The real-time code bit 153 is written when the relevant table entry is created by the operating system during commonly known allocation schemes. It is noted that the table entries are only temporarily stored in TLB 150. A table in memory preferably is used to store table entries.

The TLB real-time lock bit 153 facilitates real-time code to be stored in L2 cache without being overwritten through normal cache replacement behavior. Because cache subsystems typically overwrite their contents based on a least recently used scheme, real-time code executed from cache is at risk for being overwritten before it is completely executed. To avoid overwriting real-time code, the L2 cache is able to lock in specified contents.

The L2 cache subsystem 200 preferably includes an L2 cache memory 201 coupled to a cache management unit 202 for directing the transfers of data into and out of the L2 cache memory 201. Cache management unit 202 also controls and orchestrates the transfer of data, address and control signals between local bus 130 and system memory 300. Cache management unit 202 preferably includes a memory controller for providing access to L2 cache memory 201. The memory controller may be any one of a number of commonly known memory controllers compatible with the selected CPU core 110 and overall computer architecture. Such a memory controller may be located as part of the processor 101. Processor 101 also includes a real-time lock output signal 161 preferably provided to the cache management unit 202. The real-time lock signal 161 indicates that the information in system memory 300 requested by processor 101 includes real-time code. This feature will be explained in more depth below. L2 cache subsystem 200 also includes a bus interface 235 which provides an interface to system memory 300.

L2 cache memory 201 includes a plurality of cache lines 220. Associated with each line of L2 cache memory 201 is address tag and state information (not specifically shown). The address tag indicates a physical address in system memory 300 corresponding to each entry within cache memory 201. In this embodiment each entry within L2 cache memory 201 is capable of storing a line of data. A line of data preferably consists of four double words 221 (where each double word comprises 32 bits). It is understood, however, that a line could contain any number of word or double words, depending upon the system. It is further understood that a double word could consist of any number of bits.

The state information is comprised of a valid bit and a set of dirty bits. A separate dirty bit is allocated for each double word within each line. A valid bit indicates whether a predetermined cache line contains valid cache data, while the dirty bits identify the write status of each double word within each cache line. In an invalid state, there is no valid data in the corresponding cache memory entry. In a valid and clean state, the cache memory entry contains data which is consistent with system memory 300. In a valid and dirty state, the cache memory entry contains valid data which is inconsistent with system memory 300. Typically, the dirty state results when a cache memory entry is altered by a write operation.

Cache management unit 202 includes an address tag and state logic circuit (not specifically shown) that contains and manages the address tag and state information. A comparator circuit for determining whether a cache hit has occurred, and a snoop write-back circuit that controls the write back of dirty data within L2 cache memory 201. It will be appreciated by those skilled in the art that cache management unit 202 may contain additional conventional circuits to control well-known caching functions such as various read, write, update, invalidate, copy-back, and flush operations. Such circuitry may be implemented using a variety of configurations.

In one embodiment, L2 cache subsystem 200 comprises a set associative cache configuration. Least recently used replacement may be employed to select one of the ways for replacement.

System memory 300 is a physical memory device of a predetermined size and may be implemented with DRAM (dynamic random access memory). System memory 300 may be used to store data, code, and the like. The code stored in system memory 300 includes real-time 320. Multiple real-time code modules may be stored in system memory 300.

Referring still to FIG. 2, cache memory 201 includes a plurality of lines of data 220. Preferably associated with each line of data is a lock bit 230. The lock bit can be set to lock the associated line of data. Once locked, the line of data cannot be overwritten pursuant to normal cache behavior in which the least recently used cache line is overwritten by new data to be stored in the cache. The lock bit overrides the least recently used replacement scheme for the line associated with the lock bit. A "0" value for the lock bit indicates that the associated line of data is not locked, where as a lock bit value of "1" indicates that the line of data is locked. The logic level of the lock bits, of course, can be reversed, i.e. a "0" value indicating the associated line is locked and a "1" value indicating that the associated line is not locked. For purposes of the following discussion, it is assumed that a logic "1" lock bit value indicates the locked condition. To specify which cache contents to lock, computer system 100 asserts its real-time lock output signal on line 161 to indicate to the cache management unit 202 when to lock data in cache.

Consistent with the preferred embodiment, generally four major steps facilitate the execution of real-time code from L2 cache. These steps presuppose that the targeted real-time code module has already been written by the operating system into the system memory 300 from a disk or other medium on which the code was stored. First, the processor directs the entire block of real-time code to be stored in the L2 cache memory 201 while indicating to the cache management unit 202 that the information being stored in cache comprises real-time code, as opposed to non-real-time code, data, or other types of information. Second, the L2 cache subsystem 200 locks the real-time code into the L2 cache memory 201 to avoid overwriting. Third, the processor 101 executes the real-time code after it has been stored in L2 cache memory 201. Lastly, after the processor has completed its execution of the real-time code from L2 cache memory and no longer needs access to the code, the L2 cache subsystem unlocks the real-time code freeing up that part of L2 cache memory for other real-time code modules.

Software to be executed by CPU core 110 normally is transferred from a disk to system memory 300 and then fetched from system memory 300 by CPU core 110 through the L2 cache subsystem 200 and lines 160. Consistent with the preferred embodiment, computer system 100 takes advantage of the L2 cache memory's lock bits, the TLB real-time code bit, and the processor's real-time lock output signal 161 to allow execution of real-time code 320 from L2 cache memory 201, instead of system memory 300.

Figure 3:
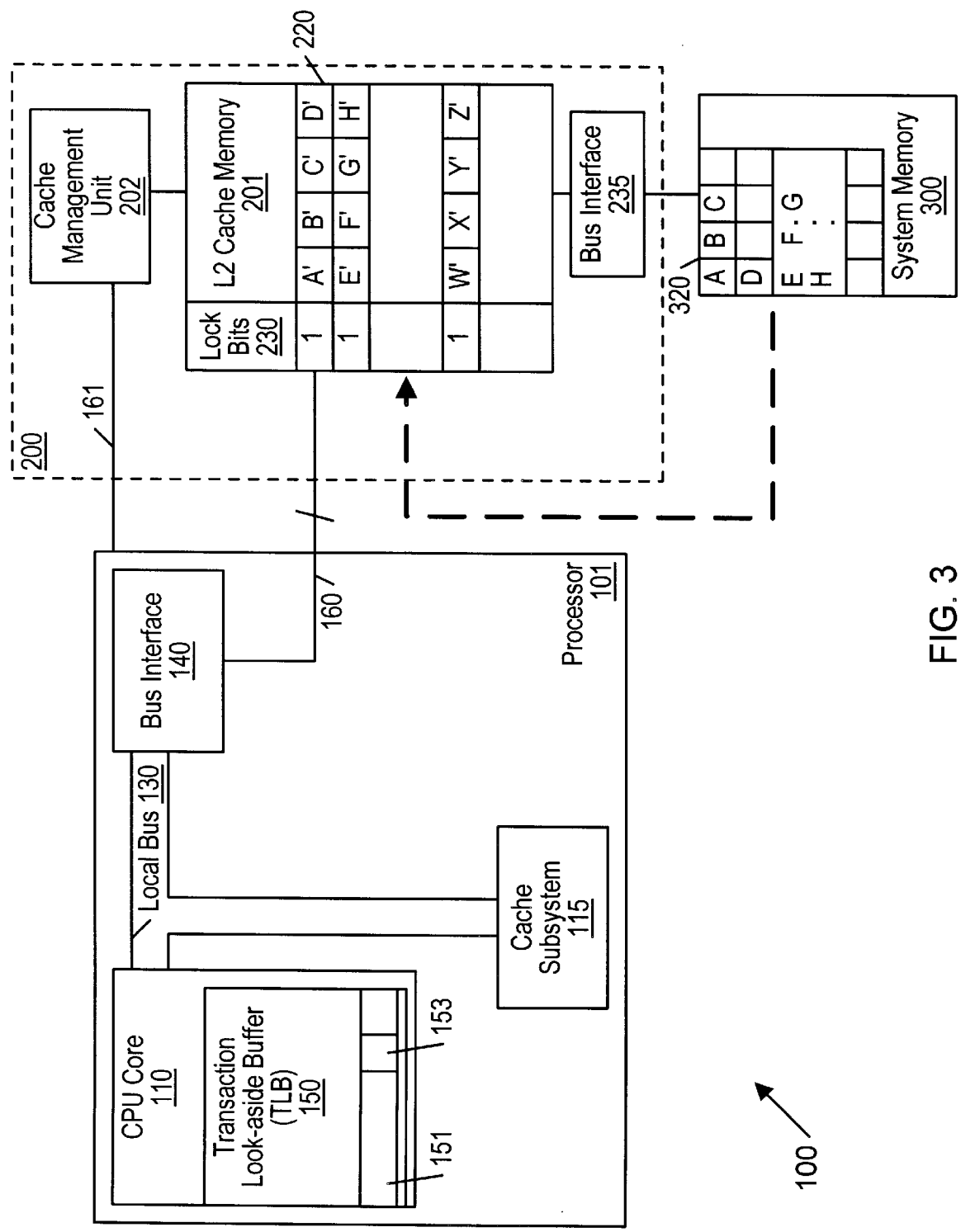
FIG. 3 is a block diagram of the preferred computer system showing the data flow of real-time code into cache.

Referring now to FIG. 3, a block diagram illustrating the flow of data within computer system 100 to transfer real-time code 320 from system memory 300 to cache memory 201 is shown. Real-time code 320 consists of a plurality of double words, as exemplified by double words "A" through "Z." Before the CPU core 110 executes real-time code 320 from L2 cache memory 201, the CPU core 110 must have the real-time code 320 transferred from system memory 300 to L2 cache memory 201. This process preferably is accomplished by a read operation by the CPU code 110 of all of the double words in system memory 300 comprising real-time code 320. Because the real-time code 320 does not already exist in the L2 cache memory 201 when the CPU 110 reads the real-time code 320 for the first time, the cache management unit 202 detects a read miss and directs the real-time code to be transferred into L2 cache memory 201 pursuant to normal L2 cache behavior. A copy of the real-time code thus is placed in L2 cache memory 201 as indicated by the lines of L2 cache memory comprising double words "A" through "Z".

These lines of cache containing real-time code ultimately must be locked to prevent replacement. The L2 cache subsystem 200, therefore, must be made aware which of its contents include real-time code and which do not. The processor 101 provides this indication by asserting the real-time lock output signal while reading the code from system memory 300. This signal indicates to the cache management unit 202 that it must lock the lines of cache in which it writes the associated real-time code.

The following discussion describes how the processor 101 determines that the code it requests for executing is real-time code. As stated, the TLB 150 includes a real-time code bit for each entry. Thus, when the processor initiates a read request and translates the requested virtual address to a physical address by accessing the TLB, the CPU core 110 reads the associated real-time code bit 153. If the bit is set to indicate that the requested information is real-time code, the processor asserts its real-time lock output signal on line 161 while also asserting the address and data signals to effectuate a read cycle.

Upon detecting a read miss while the processor's real-time lock output signal is asserted, the cache management unit 202 writes the requested real-time code 320 to L2 cache memory 201 and sets the lock bit associated with that line to a logic "1" indicating that this line of cache memory cannot be overwritten by subsequent cache replacement activity. Alternatively, the cache management 202 may wait until the entire real-time code 320 is stored in L2 cache memory 201 before setting all of the lock bits to a logic "1" level. Once the real-time code is completely stored in L2 cache memory 201 and all of the associated lock bits are set, the CPU core 110 then can execute the real-time code 320. At this point, as one of ordinary skill in the art will readily understand, it is transparent to the CPU core 110 that execution of the real-time code is from L2 cache memory 201 instead of from system memory 300. The CPU core 110 fetches each instruction of the real-time event handler by issuing physical addresses pertaining to locations in system memory 300 of the real-time code 320. The cache management unit 202, however, detects a read hit as the requested instruction of the real-time code is also stored in L2 cache memory 201. In response, the cache management unit 202 directs the requested instruction to be supplied to the CPU core 110 from L2 cache memory 201 instead of from system memory 300. In this manner, the real-time event handler is executed by the CPU core 110 from L2 cache memory 201 with reduced latency and increased latency predictability.

Once the real-time code 320 is completely executed, it may be desired to unlock the real-time code 320 from L2 cache memory, thus freeing up cache entries for other code or data. Cache lines are unlocked by changing the state of the lock bit associated with the targeted lines. In computer systems consistent with the preferred embodiment, invalidate or flush operations preferably are used to unlock cache entries. Invalidating the cache preferably is initiated upon operating system reallocation of the page corresponding to the real-time code, as one of ordinary skill in the art would understand. For example, when a page is selected for reallocation, if the current translation to the page has the real-time code bit set, the operating system may execute a flush operation to each line in the page. L2 subsystem 200 resets the lock bit for the corresponding line. Alternatively, a flush operation indicated to be a real-time operation via real-time signal 161 may cause all of the lock bits to be reset.

Figure 4:
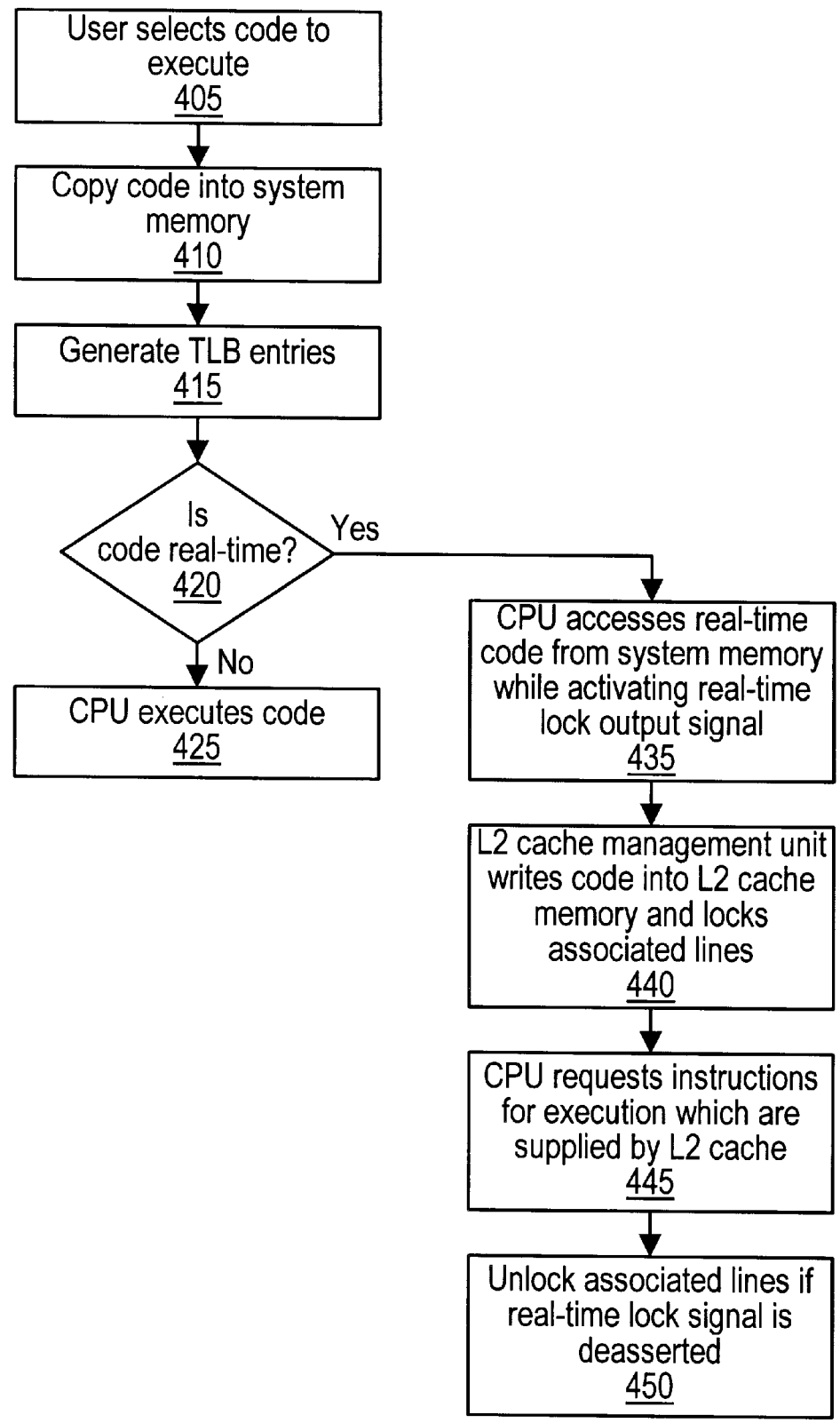
FIG. 4 is a flow chart outlining the steps in executing real-time code from cache memory.

FIG. 4 shows a flow diagram exemplifying a method consistent with the preferred embodiment for executing real-time code from L2 cache memory. In step 405, the real-time code module to be executed is selected and copied into the system memory by the operating system (step 410). Page allocations and TLB entries in step 415 are updated and if the code copied into system memory is a real-time module, the real-time bit in the corresponding TLB entry is updated. The CPU determines whether the code is real-time or not in step 420 by accessing and checking the state of the real-time code bit corresponding to the real-time code. If the code is real-time, the CPU accesses the entire code in step 435. Upon detecting a read miss in step 440, the L2 cache subsystem writes the real-time code into cache and locks the associated lines. In step 445, the CPU may then execute the real-time code by fetching instructions which are provided by the L2 cache where the code is stored. Finally, in step 450, the lines of cache memory that were used to store the real-time code are unlocked as described above. If however, the code is not real-time (step 420), the CPU fetches the code from memory and executes it according to known protocols.

It is noted that while the L2 cache in FIGS. 1–3 is interposed between the processor 101 and system memory 300, other cache configurations are possible. For example, the cache may comprise a look aside configuration or backside cache configuration in which a system memory bus couples the CPU, cache, and system memory.

Figure 5:
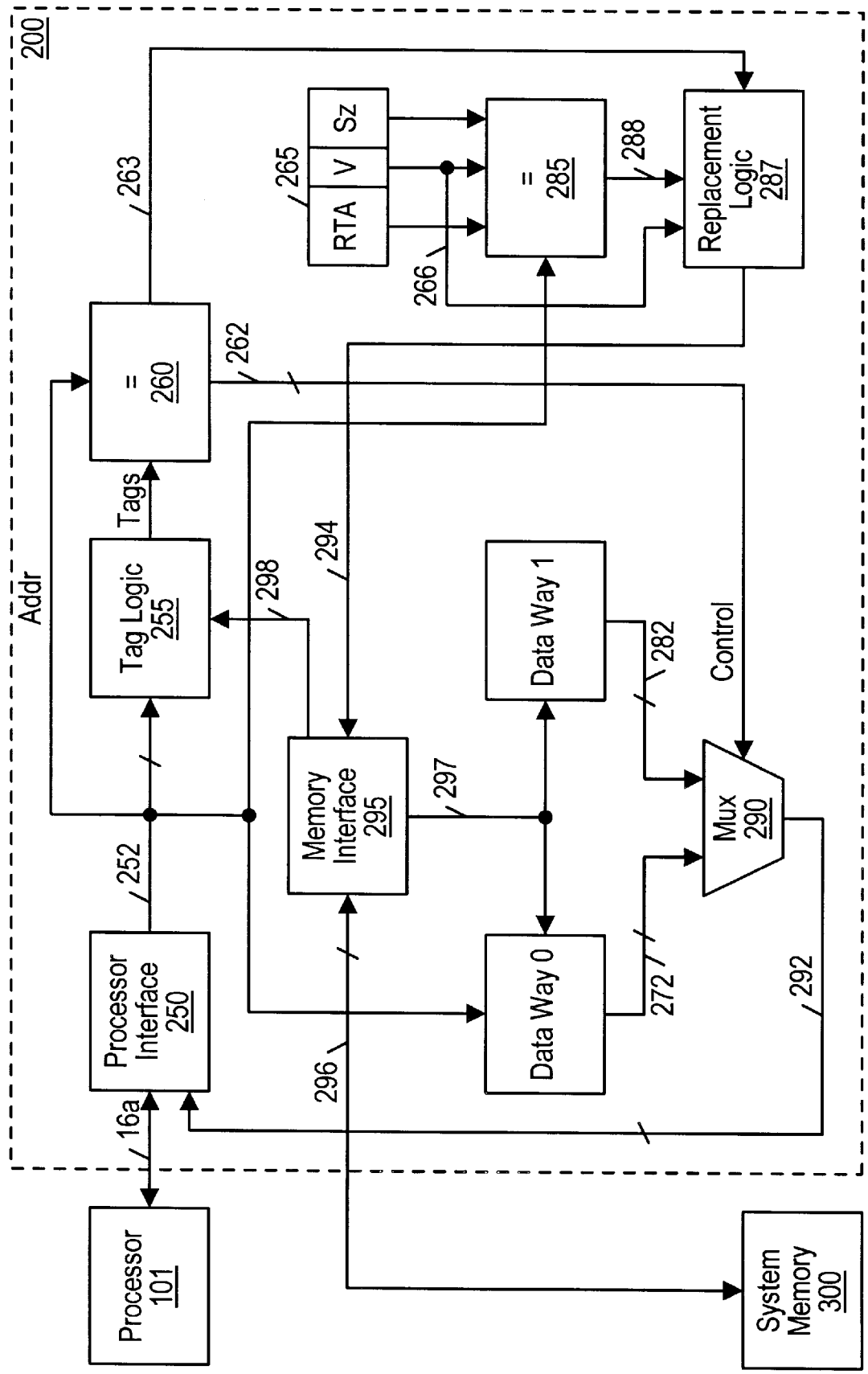
FIG. 5 is a block diagram showing an alternative embodiment for locking real-time code in cache.

Referring now to FIG. 5, an alternative embodiment for locking real-time code into cache is shown to comprise L2 cache subsystem 200 coupled to processor 101 over lines 160 and to system memory 300. L2 subsystem 200 includes a processor interface 250, tag logic 255, memory interface 295, data way 0, data way 1, multiplexer 290, comparators 260 and 285, real-time address registers 265, and replacement logic 287. Processor interface 250 couples to tag logic 255, data way 0, and comparators 260, 285 over lines 252. Tag logic 255 provides tag information to comparator 260 which compares the address signals provided by processor interface 250 to the tag information provided by tag logic 255 to determine the existence of a cache hit or miss, as one of ordinary skill in the art would know. Comparator 260 provides an output signal on line 262 to multiplexer 290 and another output signal on line 263 to replacement logic 287. The output signal provided to multiplexer 290 is asserted upon detecting a cache hit by comparator 260 to select the requested data from the data way that contains the requested data. The output signal on line 263 indicates the presence of a cache miss to replacement logic 287.

Memory interface 295 directs the operation of data way 0 and data way 1 via lines 297 dining cache hits and misses and also provides communication with system memory 300 over lines 296 for retrieving data from system memory 300 to be stored in one of the two data ways. Although only two data ways are shown in FIG. 5, one of ordinary skill in the art will recognize that the invention could include additional data ways. The output signals from data way 0 and data way 1 over lines 272, 282, respectively are provided to multiplexer 290. Multiplexer 290 is a known 2:1 multiplexer in which one of two input signals is provided as an output signal in response to the state of a control signal. During a cache miss, multiplexer 290 is controlled by the output signal from comparator 260 on line 262. The signal on line 262 determines which of the two input signals on lines 272 and 282 are to be selected by multiplexer 290 as an output signal on line 292. The output signal of multiplexer 290 is provided to processor interface 250.

During a cache miss, memory interface 295 is controlled by replacement logic 287 to store data corresponding to the new address (i.e., the address for which there was a cache miss) in one of the data ways. Memory interface 295 retrieves the requested data from system memory over lines 296 and stores the data in one of the two data ways as determined by replacement logic 287 in accordance with the present invention.

Real time address register 265, although shown as a single register in FIG. 5, may include multiple registers. Each register preferably includes a real-time address field (RTA), a valid bit field (V), and a size field (Sz) associated with a real-time code module. The real-time address field preferably includes the starting address of the real-time code. The size field indicates the size of the real time code whose starting address is specified in the RTA field of register 265. The RTA and Sz fields thus specificy the location of real-time code in system memory. As explained below, by comparing and address from processor 101 to the contents of register 265, comparator 285 can determine whether the address is an address pertaining to real-time code. The V bit indicates whether the real time code locking feature of the present invention associated with the real time code beginning at the RTA address is enabled or disabled. Thus, a V bit that is set indicates that the real-time code locking feature is turned on (enabled) for the real-time code specified by the RTA and Sz fields. Conversely, the real-time code locking feature can be turned off (disabled) by clearing the V bit. The contents of the real-time address register preferably is initiated by the computer's operating system or a device driver as one of ordinary skill will recognize.

It should be recognized that the contents of register 265 generally define which system memory addresses contain real-time code. Thus, register 265 could be configured differently than that described above. For example, register 265 could include a beginning and an ending address instead of a beginning address and a size value.

The contents of real-time address register 265 is provided to comparator 285 which compares the contents of the real-time address register 265 to the address provided by processor interface 250. Comparator 285 provides an output signal to replacement logic 287 over lines 288 to indicate whether the address from processor interface 250 is an address corresponding to real-time code, or not. Replacement logic 287 provides control signals to memory interface 295 over lines 294 generally for directing the storage into cache of real-time code in accordance with the present invention.

The operation of the alternative embodiment shown in FIG. 5 will now be described with reference to four situations—(1) valid bit not set, cache miss, (2) valid bit set, cache miss, and address within the real-time address range specified by register 265, (3) valid bit set, cache miss, and address not within real-time address range specified by register 265, and (4) cache hit. In the second and third situations, it will be seen that data way 1 is used to store real-time code and data way 0 is used to store nonreal-time code. However, the selection of which data way to use for storing real-time code is not important. Thus, data way 0 could be used to store real-time code.

In the first situation in which a cache miss is detected and the V bits of registers 265 are cleared indicating that the real-time code locking feature of the present invention has been turned off, L2 cache subsystem 200 functions in accordance with known cache protocol. An address provided to processor interface 250 is compared against the tags stored in tag logic 255. Upon detection of cache miss by comparator 260 (i.e., the data corresponding to the address provided by processor interface 250 is not currently stored in either data way), a signal on line 263 directs the replacement logic 287 to store data corresponding to that address in one of the data ways. The V bits from register 265 are also provided to replacement logic 287 on line 266 and thus replacement logic 287 can determine that the locking feature of the invention is disabled. In this situation (cache miss, V bits clear), the replacement logic 287 stores the data corresponding to the address from processor interface 250 in either data way in accordance with known protocols. The data to be stored in cache is retrieved from system memory 300 over lines 296 by memory interface 295 and stored in the selected data way. Replacement logic 287 may use in any commonly known replacement algorithm such as the least recently used algorithm in which the least recently used datum in the data ways is replaced by the new data. Tag logic 255 is then updated by memory interface 295 to include the tag associated with the new data stored in the data ways.

In the second situation, at least one of the valid bits in registers 265 is set indicating that the real-time locking feature of the present invention is enabled, and a cache miss occurs. A cache miss for a real-time code address results in the storage of the associated real-time code in data way 1. Comparator 260 compares the address to tags from tag logic 255 and indicates the existence of a cache miss on line 263 to replacement logic 287. Comparator 285 consequently compares the address from processor interface 250 to the range of real-time addressed specified by registers 265 and determines that the address from processor interface 250 falls within the range of real-time addresses. Comparator 285 provides a signal on line 288 to replacement logic 287 indicating that the new address pertains to real-time code. In response, replacement logic 287 directs the memory interface 250 to retrieve the real-time code associated with the current address. After retrieval of the real time code, the real-time code is stored in data way 1 without replacing any other real-time code already stored in data way 1. As explained previously, data way 1 is dedicated to the storage of real-time code when a V bit is set. Replacement logic 287 and memory interface 295 cooperate to prevent any real-time code from being replaced when the real-time code locking feature is enabled.

The third situation is similar to the second situation except that the address received by processor interface 250 is not an address for real-time code. Comparator 260 detects a cache miss and comparator 285 determines that the new address does not lie within the real-time address range specified by registers 265, and that at least one V bit is set indicating that the real-time code feature of the present invention is enabled. Comparator 285 indicates to replacement logic 287 on lines 288 that the address is not a real-time code address. In response, replacement logic 287 directs the memory interface to retrieve the data corresponding to the address from system memory 300 and store it in data way 0 preferably according to the least recently used algorithm described previously.

In the fourth situation comparator 260 detects a cache hit upon comparing the address from processor interface 250 and tags from tag logic 255. The output signal from comparator 260 on line 262 is asserted indicating the presence of a cache hit and also indicates in which of the data ways the requested data is located. Multiplexer 290 uses this output signal as a control signal and provides on its output lines 292 the data from the data way specified by the state of the control signal. The requested data is provided to processor 101 through processor interface 250.

It should be recognized that the real-time code locking feature of the present invention can be disabled by simply clearing all of the V bits in registers 265. Once the V bits are cleared, cache storage proceeds in accordance with known protocols and new data can be stored in either data way according to, for example, the least recently used method.

Numerous variations and modifications will become apparent to those skilled in the art once the above disclosure is fully appreciated. For example, cache subsystems internal to the processor (so called "L1 caches") may be used for storing, locking, and executing real-time code. It is intended that the following claims be interpreted to embrace all such variations and modifications.

What is claimed is:

1. A computer system for executing code from cache memory comprising:

a processor for executing code;

a system memory device for storing code and data;

a system bus coupling said processor and said system memory;

a cache memory subsystem coupled to said system bus, wherein said cache memory subsystem includes a plurality of data ways, wherein each data way includes a plurality of cache entries each configured for temporary storage of a line of code or data, wherein the cache entries of at least one of said plurality of data ways are lockable to lock real-time code therein, and wherein the cache entries of at least another of said plurality of data ways are not lockable.

2. The computer system of claim 1, wherein said processor includes a translation lookaside buffer (TLB) which includes a real-time code bit which indicates whether information stored in said system memory device corresponding to the real-time code bit comprises real-time code.

3. The computer system of claim 2, wherein said processor is configured to assert a real-time code output signal.

4. The computer system of claim 3, wherein real-time code is stored and locked in said at least one of said plurality of data ways of said cache memory subsystem upon assertion of said real-time code output signal by said processor during a read operation by said processor.

5. The computer system of claim 4, wherein said cache memory subsystem upon storing said real-time code in said at least one of said plurality of data ways of said cache memory subsystem, locks said lines of cache in which said real-time code is stored in response to receiving said real-time code output signal from said processor.

6. A method of executing real-time code from cache memory, wherein said cache memory includes a plurality of data ways, wherein each data way includes a plurality of cache entries each configured for temporary storage of a line of code or data, wherein the cache entries of at least one of said plurality of data ways are lockable to lock real-time code therein, and wherein the cache entries of at least another of said plurality of data ways are not lockable, the method comprising the steps of:

(a) updating entries in a TLB for translating virtual addresses associated with real-time code to physical addresses;

(b) further updating a real-time code bit to ascertain if code to be executed comprises real-time code;

(c) reading said real-time code bit to ascertain if code to be executed comprises real-time code;

(d) a processor reading said real-time code if said real-time code bit indicates the presence of real-time code;

(e) storing said real-time code in one of said at least one of said plurality of data ways of said cache memory;

(f) locking said real-time code into said one of said at least one of said plurality of data ways of said cache memory to prevent overwrites; and (g) executing said real-time code from said cache memory.

7. The method of claim 6, wherein the step of locking said real-time code into said cache memory includes setting a lock bit associated with each line of cache memory containing real-time code.

8. The method of claim 6, wherein said real-time code is unlocked from said cache memory after execution of the real-time code.

9. The method of claim 6, wherein said executing said real-time code comprises said real-time code which operates on real-time data including multimedia data.

10. A cache system for storing and locking real-time code, comprising:

a first cache data way that is not lockable;

a second cache data way in which real-time code is lockable when stored therein;

a memory interface coupled to said first data way and said second data way;

a real-time address register that includes addresses associated with real-time code stored in said second cache data way; and a comparator that compares an address received by said cache system with the contents of said real-time address register to determine if said address corresponds to real-time code.

11. The cache system of claim 10 wherein said real-time address register includes a starting address of said real-time code.

12. The cache system of claim 11 wherein said real-time address register further includes a size value indicating the size of the said real-time code.

13. The cache system of claim 12 wherein said real-time address register further includes a valid bit indicating whether said real-time code is to be locked in said second cache data way of said cache system.

14. The cache system of claim 13 further including:

a memory interface coupled to said first cache data way and said second cache data way; and replacement logic coupled to said memory interface and said comparator.

15. The cache system of claim 14 wherein said comparator provides a signal to said replacement logic, wherein said signal indicates whether said address received by said cache system is an address included in said real-time address register.

16. The cache system of claim 15 wherein said valid bit from said real-time address register is provided to said replacement logic, wherein said replacement logic directs said memory interface to store real-time code exclusively into said second data way if said valid bit received from said real-time address register is set and said signal from said comparator indicates that an address received by said cache system is an address included in said real-time address register.

17. The cache system of claim 10, wherein said real-time code operates on real-time data including multimedia data.

* * * * *